United States Patent
Segura

(10) Patent No.: US 11,879,306 B2
(45) Date of Patent: *Jan. 23, 2024

(54) SYSTEM AND METHOD FOR ATTACHING A POPPET TO AN ELECTROMECHANICAL ACTUATOR APPARATUS

(71) Applicant: Bench Tree Group, LLC, Georgetown, TX (US)

(72) Inventor: Pedro R. Segura, Round Rock, TX (US)

(73) Assignee: Bench Tree Group, LLC, Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,168

(22) Filed: Aug. 8, 2022

(65) Prior Publication Data

US 2023/0081450 A1 Mar. 16, 2023

Related U.S. Application Data

(63) Continuation of application No. 16/899,127, filed on Jun. 11, 2020, now Pat. No. 11,408,249.

(60) Provisional application No. 62/859,980, filed on Jun. 11, 2019.

(51) Int. Cl.
  *E21B 34/06* (2006.01)
  *F16K 31/00* (2006.01)
  *E21B 23/00* (2006.01)

(52) U.S. Cl.
  CPC ............ *E21B 34/066* (2013.01); *E21B 23/00* (2013.01); *F16K 31/004* (2013.01)

(58) Field of Classification Search
  CPC ...... E21B 34/066; E21B 23/00; F16K 31/004; F16K 1/36; F16K 31/047; F16K 31/508
  See application file for complete search history.

(56) References Cited

U.S. PATENT DOCUMENTS

| | | | | |
|---|---|---|---|---|
| 3,476,135 A | * | 11/1969 | Canalizo | E21B 43/123 137/155 |
| 6,182,363 B1 | * | 2/2001 | Venable | B23P 15/001 29/446 |
| 7,564,741 B2 | * | 7/2009 | Pratt | E21B 47/24 340/854.3 |

(Continued)

OTHER PUBLICATIONS

Kah, Paul; Overview of techniques for joining dissimilar materials, the Fabricator, Sep. 12, 2017, 9 pages.

*Primary Examiner* — Jonathan Malikasim
(74) *Attorney, Agent, or Firm* — DUNLAP CODDING, P.C.

(57) ABSTRACT

An assembly having a coupling component and a poppet is disclosed. The coupling component has a first end. The first end has an opening extending into the coupling component, such that the coupling component has a sidewall extending around and defining the opening, the sidewall at least partially constructed of a ductile material. The poppet is positioned within the opening. The poppet has a first end outside of the opening, a second end within the opening, and an outer surface extending between the first end and the second end. The poppet has a recess positioned between the first end and the second end, the recess being defined by at least one sidewall and a bottom. At least a portion of the ductile material of the sidewall is positioned within the recess to secure the poppet into the opening.

11 Claims, 2 Drawing Sheets

(56) References Cited

U.S. PATENT DOCUMENTS

| | | | |
|---|---|---|---|
| 8,757,592 B2* | 6/2014 | Marica | F04B 37/14 |
| | | | 251/294 |
| 11,408,249 B2* | 8/2022 | Segura | F16K 31/004 |

* cited by examiner

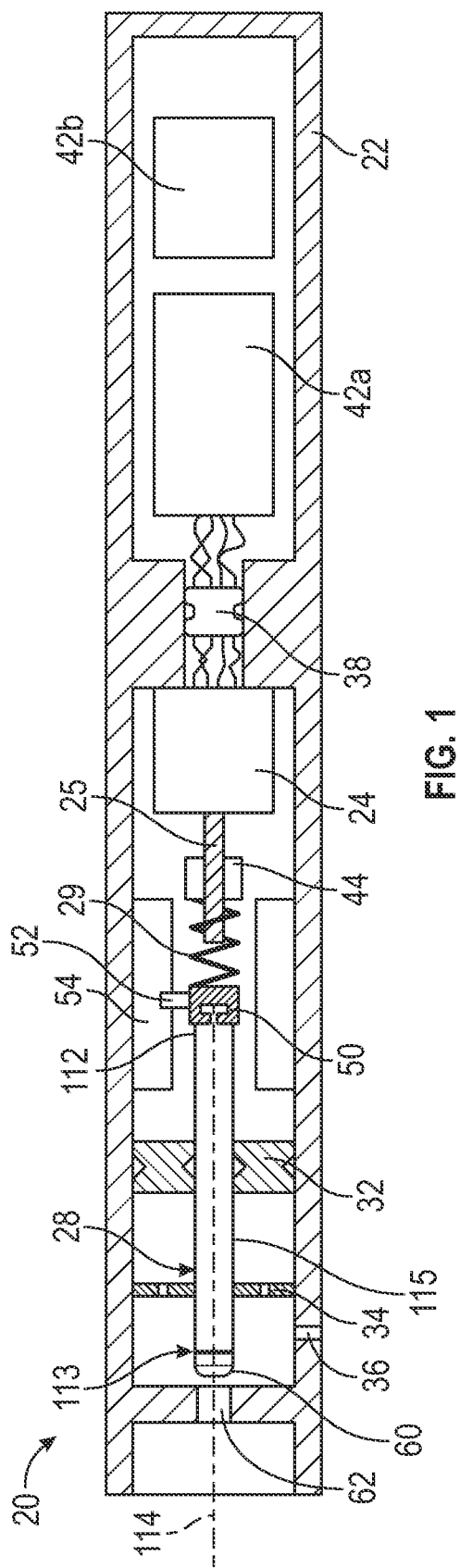
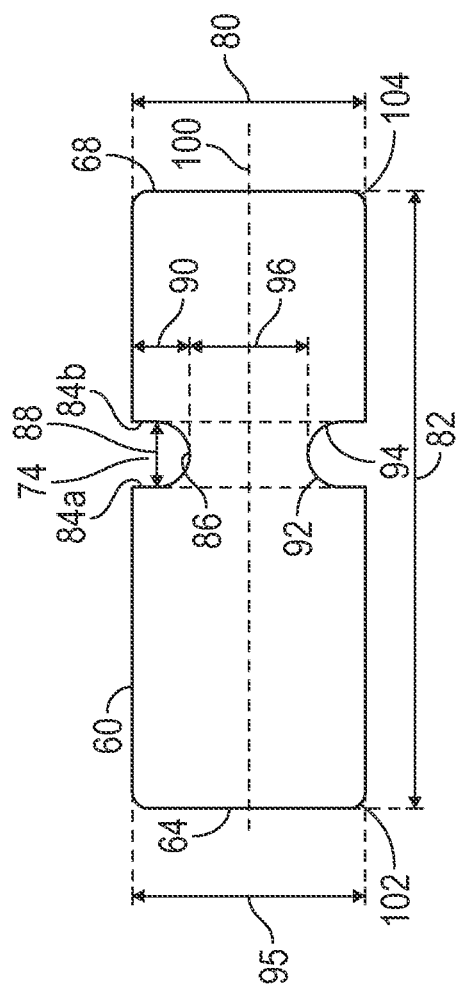
FIG. 1
FIG. 2

SYSTEM AND METHOD FOR ATTACHING A POPPET TO AN ELECTROMECHANICAL ACTUATOR APPARATUS

INCORPORATION BY REFERENCE

The present application is a continuation of U.S. Ser. No. 16/899,127, filed on Jun. 11, 2020, which claims priority to the provisional patent application identified by U.S. Ser. 62/859,980, filed on Jun. 11, 2019, the entire content of which is hereby incorporated herein by reference.

BACKGROUND

Electromechanical actuator systems generally are well known and have existed for a number of years. In the downhole industry (oil, gas, mining, water, exploration, construction, etc), an electromechanical actuator may be used as part of tools or systems that include but are not limited to, reamers, adjustable gauge stabilizers, vertical steerable tools, rotary steerable tools, by-pass valves, packers, down hole valves, whipstocks, latch or release mechanisms, anchor mechanisms, or measurement while drilling (MWD) pulsers. For example, in an MWD pulser, the actuator may be used for actuating a pilot/servo valve mechanism for operating a larger mud hydraulically actuated valve. Such a valve may be used as part of a system that is used to communicate data from the bottom of a drilling hole near the drill bit (known as down hole) back to the surface. The down hole portion of these communication systems are known as mud pulsers because the systems create programmatic pressure pulses in a mud or a fluid column that can be used to communicate digital data from the down hole to the surface. Mud pulsers generally are well known and there are many different implementations of mud pulsers as well as the mechanism that may be used to generate the mud pulses.

Many existing systems have cylindrical valve components constructed of a hard and brittle material connected to a shaft of an actuator. The hard and brittle material is ceramic or carbide. The shaft of the actuator, on the other hand, is made of a different type of material, such as a steel alloy, stainless steel alloy, or nickel alloy, that is more ductile and has a higher tensile strength than the poppet. Attaching very hard and brittle materials to the more ductile and higher tensile strength shaft of the actuator has proven challenging, especially in harsh environments. In addition, the small size of some components, such as a servo valve poppet, has added to the difficulty of attaching the poppet to the shaft of the actuator. A typical servo poppet is cylindrically shaped, and is ½ long and 5/16 in width.

Many attempts have been proposed to attach the poppet to the shaft of the actuator. Threading, securing with screws, securing with pins, brazing/soldering, press fitting, clamping with set screws have been used in the past. In addition, making the poppet and the shaft of the actuator as a unitary structure out of the hard and brittle material has also been proposed. Combinations of these techniques have been used also.

Manufacturing threads, in hard and brittle materials requires grinding, EDMing, or bushings made from one or more ductile material. Such features also create stress concentrations at which cracks can initiate. Threaded fasteners can become loose in high vibration and temperature cycling environments. Thread lockers such as Loctite degrade in drilling fluids. Screws and pins have relatively small shear areas and can create stress concentrations in the poppet, leading to failure.

Capturing the hard and brittle material of the poppet between other components, such as component shoulders or retaining rings, is not always feasible. Brazing or soldering the poppet to the shaft of the actuator can be unreliable due to process sensitivity and corrosion. Brazing or soldering adds an additional dissimilar metal that can cause anodic corrosion. Corrosion can be accelerated in typically used borehole fluids. Press fitting or clamping the poppet into the shaft of the actuator can be unreliable due to the low frictional coefficient of these hard materials and thermal expansion rate differences between the carbide/ceramic and metal alloys. Roughening the outer surface of the poppet to enhance frictional engagement can cause additional issues, as the roughened surface can create sites for crack initiation and failure also.

Thus, it is desirable to increase the reliability and strength of the connection between the poppet and the shaft of the actuator. It is to a solution to the problems discussed above that the present disclosure is directed.

BRIEF DESCRIPTION OF THE DRAWINGS

FIG. 1 is a cross-sectional diagram of an exemplary electromechanical actuator having a poppet secured to a servo shaft of an actuator in accordance with the present disclosure.

FIG. 2 is a side elevational view of an embodiment of the poppet of the electromechanical actuator constructed in accordance with the present disclosure.

DETAILED DESCRIPTION OF ONE OR MORE EMBODIMENTS

Figures 3, 3A:
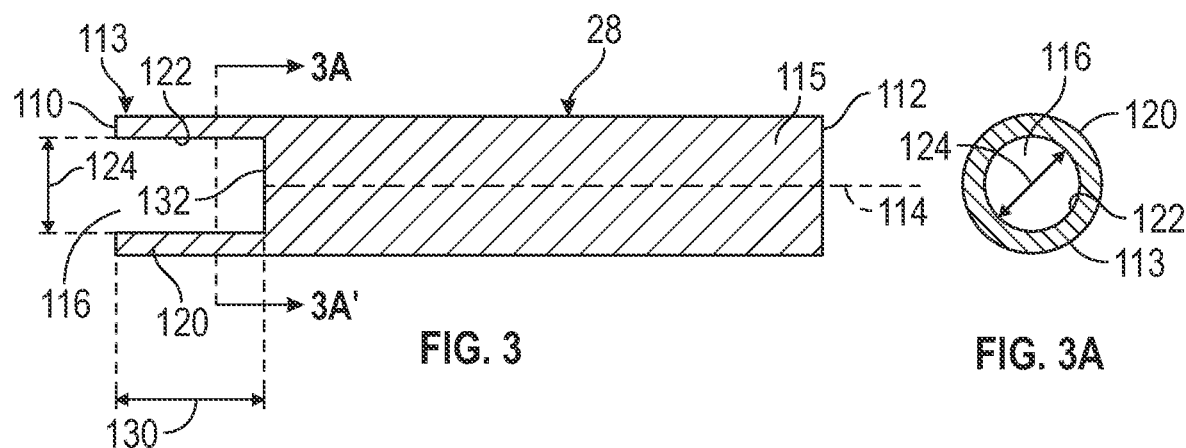
FIG. 3 is a cross-sectional view of an exemplary embodiment of the servo shaft of the electromechanical actuator constructed in accordance with the present disclosure.
FIG. 3A is a cross-sectional view of a sidewall of the servo shaft as designated by the lines 3A-3A shown in FIG. 3.

The following detailed description refers to the accompanying drawings. The same reference numbers in different drawings may identify the same or similar elements.

The mechanisms proposed in this disclosure circumvent issues described above. The apparatus and method are applicable to the actuation of down-hole tools, such as in borehole drilling, workover, and production, and it is in this context that the apparatus and method will be described. The down-hole tools that may utilize, be actuated and controlled using the apparatus and method may include but are not limited to a reamer, an adjustable gauge stabilizer, vertical steerable tool, rotary steerable tool, by-pass valve, packer, control valve, latch or release mechanism, and/or anchor mechanism. For example, in one application, the actuator may be used for actuating a pilot/servo valve mechanism for operating a larger mud hydraulically actuated valve such as in an MWD pulser.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transitory memory includes random access memory, read only memory, flash memory or the like. Such non-transitory memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

FIG. 1 is an illustration of an electromechanical actuator assembly 20 that may be used, for example, in a down-hole MWD pulser tool. The electromechanical actuator assembly 20 may comprise a housing 22, a rotary actuator 24, and a lead or ball screw 25 that actuates a servo shaft 28. The electromechanical actuator assembly 20 may also have one or more shock absorbing and self-aligning members 29 that absorb shocks from the rotary actuator 24 and may compensate for misalignments. The shock absorbing and self-aligning member 29 may also absorb shock applied to the servo shaft 28 by external forces. In one implementation (for a particular set of load and temperature requirements), the shock absorbing and self-aligning member 29 (as shown in FIG. 1) may be a machined helical spring that is made of metal integral to the coupling between the reciprocating nut of the ball screw 25 and the servo shaft 28. However, the shock absorbing member and self-aligning member 29 may take other forms and may also be made of different materials as would be chosen by someone of ordinary skill in the art and depending on the load and temperature requirements for a particular application.

The servo shaft 28 of the electromechanical actuator assembly 20 may also be disposed through or connected to the housing 22 through a pressure compensation system 32 and, optionally one or more buffer discs 34, such as one buffer disc or a stack of buffer discs, whose function is described below in more detail. The buffer disc 34 (see also FIG. 2) may be made of a high temperature thermoplastic, but may also be made of other materials depending on the load and temperature requirements for a particular application.

The electromechanical actuator assembly 20 may also have a fluid slurry exclusion and pressure compensating system 36 that balances pressure within the housing 22 with borehole pressure. The electromechanical actuator assembly 20 may also have a pressure sealing electrical feed thru 38 that allows the rotary actuator 24 to be electrically connected to electronic control components, but isolates the electronic control components from fluid and pressure. In particular, when downhole, the pressure within the oil filled, pressure compensated system is essentially equal to the pressure in the borehole and this pressure is primarily the result of the fluid column in the borehole. The pressure sealing electrical feed thru 38 may have a metal body with sealing features, metal conductors for electrical feed thru, and an electrically insulating and pressure sealing component (usually glass or ceramic) between the body and each of the conductors. Alternatively, the pressure sealing electrical feed thru 38 may be a plastic body with sealing features and metal conductors for electrical feed thru.

The electromechanical actuator assembly 20 may also have a set of electronic control components 42a and 42b that control the overall operation of the electromechanical actuator assembly 20 as described below in more detail. The set of electronic control components 42 are powered by an energy source (not shown) that may be, for example, one or more batteries or another source of electrical power.

In the electromechanical actuator assembly 20, the rotary actuator 24, such as, but not limited to, an electric motor, rotary solenoid, hydraulic motor, piezo motor and the like, for example, is installed with the ball or lead screw 25 integral to or attached to an output shaft (not shown) of the rotary actuator 24. The screw 25 rotates and a nut 44 on the lead screw 25 moves linearly, and reciprocates. The nut 44 is coupled to the actuated/reciprocating member(s)/component(s) such as the servo shaft 28, the shock absorbing and self-aligning member 29, coupler 50, an anti-rotation feature or member 52. Alternatively, the shaft of the rotary actuator 24 can incorporate features of the ball or lead screw 25, nut 44, or be attached to the ball or lead screw nut so that as the nut rotates, the screw moves axially and the screw 25 is integral to or coupled to the actuated/reciprocating member(s)/component(s) such as the servo shaft 28, the shock absorbing and self-aligning member 29, coupler 50, the anti-rotation feature or member 52. In the embodiment shown in FIG. 1, the nut 44 is attached or integral to reciprocating members that reciprocate with shaft-screw rotation, but the rotation of the reciprocating, axially moving, member(s) is prevented by the anti-rotation feature or member, 52. This feature or component may be, for example, a pin, key, screw-head, ball, or integrally machined feature that slides along an elongated stop or slot 54 in the surrounding actuator guide or a surrounding housing. Alternatively, the anti-rotation feature or member 52 can be attached to or be integral to the guide/housing or other adjacent structure, and will prevent rotation of the shock absorbing and self-aligning member 29 by sliding along a slot/groove or elongated stop in the shock absorbing and self-aligning member(s) 29. Alternatively, the anti-rotation feature or member 52 can be captured within elongated stops or slots or keys in both the reciprocating and the stationary member(s). The guide and/or surrounding housing and/or reciprocating members and/or rotating members may be vented to allow fluid transfer between various cavities that change volume as the servo shaft 28 of the electromechanical actuator assembly 20 reciprocates.

In one embodiment, the thrust created by loading the shock absorbing and self-aligning member 29 or applied to shock absorbing and self-aligning member 29 is countered by a member which is a combined thrust/radial bearing within the rotary actuator 24. This member, e.g., a bearing, can accommodate the axial and also radial loads while minimizing torque requirements of the rotary actuator 24. This type of bearing is well known. However, typically and in the existing downhole actuators, a thrust bearing(s) external to the rotary actuator 24 may be implemented, while the rotary actuator 24 contains only the radial support bearings. Combining the radial and thrust bearing into the rotary actuator 24, as in the described device, reduces the number of components and reduces the assembly's overall length, improving reliability, and simplifies assembly/disassembly. However, the thrust bearing can alternately or additionally be attached to or integrated within the shaft of the rotary actuator 24, or the ball/lead screw 25 non-reciprocating components as is typically done also.

Figure 4:
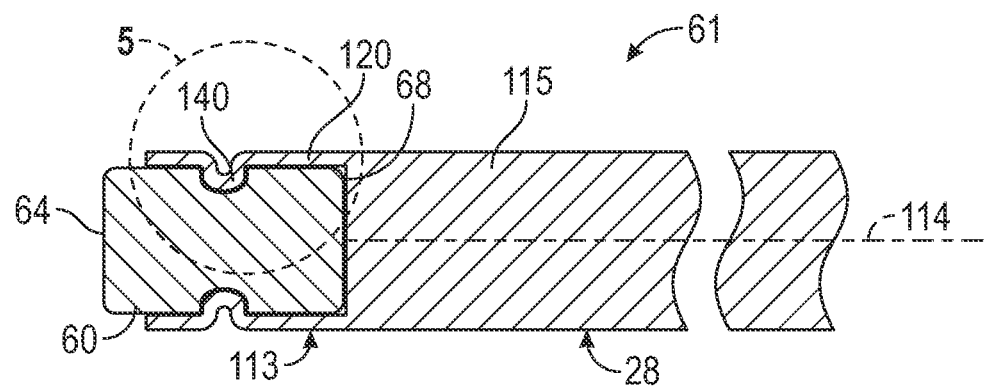
FIG. 4 is a cross-sectional view of an exemplary embodiment of the servo shaft of the actuator connected to the poppet in accordance with the present disclosure.
Figure 5:
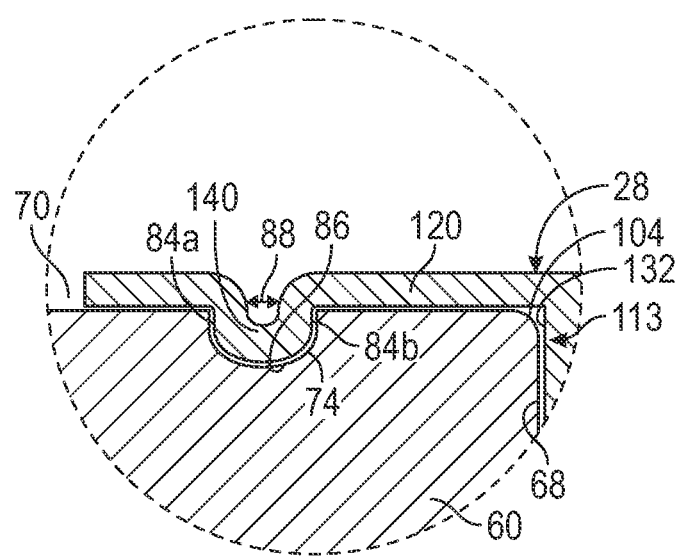
FIG. 5 is an enlarged view of FIG. 4 showing an interconnection between the servo shaft and the poppet in accordance with the present disclosure.

The electromechanical actuator assembly 20 is also provided with a poppet 60 that is connected to the servo shaft 28 in accordance with the present disclosure to form a servo shaft assembly 61 as shown in FIGS. 4 and 5. The poppet 60 is moved by the servo shaft 28 to alternately cover and expose an opening 62 in the housing 22. The poppet 60, in general, is constructed of a material having a first hardness that is greater than a second hardness of the servo shaft 28. The enhanced hardness of the poppet 60 as compared to the servo shaft 28 provides the poppet 60 with enhanced abrasion resistance. But, the enhanced hardness of the poppet 60 as compared to the servo shaft 28 also results in difficulty in connecting the poppet 60 to the servo shaft 28 as discussed above. For example, the poppet 60 can be constructed of a material having the first hardness within a range from about 90 to 92.8 as measured on a Rockwell "A" value. The poppet 60 can be constructed of a variety of materials such as tungsten carbide, which may also be known as cemented carbide. In other embodiments, the poppet 60 can be a ceramic material or a cobalt alloy. The second hardness of the servo shaft 28 is generally less than 90 as measured on the Rockwell "A" value and may be more generally in a range from about 44 to 60 as measured on a Rockwell "A" value. Further, the poppet 60 is constructed of a material that has a modulus of elasticity that is much greater than a modulus of elasticity of the servo shaft 28. For example, when the poppet 60 is constructed of cemented carbide, the modulus of elasticity may be as high as 94 million psi, which is 2 to 3 times higher than steel. This property is used to resist deflection and is extremely useful to prevent deflection of the poppet 60. But, increased stiffness and/or brittleness also results in the possibility of a fracture at any stress point within the poppet 60. Cemented carbide and ceramics that can be used to create the poppet 60 may have a fracture toughness that can range from about 8-12 MPa-m1/2. Ductile materials that can be used to form the servo shaft 28, such as stainless steel and/or nickel alloys can have fracture toughness in the range of about 112-278 MPa-m1/2.)

Referring now to FIG. 2, shown therein is a side elevational view of an embodiment of the poppet 60 of the electromechanical actuator 20 constructed in accordance with the present disclosure. The poppet 60, in this embodiment, is provided with a cylindrical shape, and has a first end 64, a second end 68, and an outer surface 70 extending therebetween. The outer surface 70 of the poppet 60 is shaped so as to provide at least one recess 74 positioned between the first end 64 and the second end 68. The recess 74 may be an annular recess (e.g., groove) extending around the entire circumference of the outer surface 70 of the poppet 60. In this example, the recess 74 is devoid of any end, due to the continuous nature of the annual recess. In other examples, the recess 74 may not be an annular recess. In this instance, the recess 74 may extend only partially about the circumference of the poppet 60, rather than extending around the entire outer surface 70 of the poppet 60. Said another way, in this instance, the recess 74 may be provided with a first end that is spaced a distance from a second end of the recess 74. The at least one recess 74 may be formed within the poppet 60 by any suitable process, such as (grinding, electrical discharge machining, or other suitable process that can precisely form the poppet 60 in the manner described herein. For example, raw carbide/ceramic powder can be pressed into shape and machined conventionally before heat treatment within a kiln. In other embodiments, the poppet 60 may be additively manufactured. As will be described in more detail below, the at least one recess 74 is sized to receive a portion of the servo shaft 28 that has been deformed into the recess 74 to form a mechanical connection between the poppet 60 and the servo shaft 28. In doing so, conventional methodologies such as threading, securing with screws, securing with pins, brazing/soldering, press fitting, clamping with set screws and the like can be avoided. In other words, in some embodiments, the portion of the servo shaft 28 that has been deformed into the recess 74 is the sole mechanical connection between the poppet 60 and the servo shaft 28. In some embodiments, the outer surface 70 of the poppet 60 is smooth (about 60 RMS or smoother), e.g., has not been roughened or threaded, so as to avoid creating locations within the poppet 60 that can cause sites where cracks or fractures can initiate.

As will be understood by the skilled artisan, the size of the poppet 60 can vary depending upon the intended use of the poppet 60. In one embodiment, the poppet 60 is provided with a width 80, and a length 82. For example, the width 80 can be 5/16 of an inch, and the length 82 can be ½ of an inch.

The recess 74 can be defined by at least one sidewall 84 and at least one bottom 86. For example, as shown in FIG. 2, the recess 74 is provided with two spatially disposed sidewalls 84a and 84b and the bottom 86. The recess 74 may also be provided with a width 88, and a depth 90. Although the width 88 and the depth 90 can vary, in one embodiment, the width 88 is 1/32 of an inch, and the depth 90 is 1/32 of an inch. To help reduce the possibility of fractures within the poppet 60, the poppet 60 can also be provided with a first root radius 92 located at an intersection of the side wall 84a and the bottom 86; and a second root radius 94 located at an intersection of the side wall 84b and the bottom 86. When the recess 74 is the annular groove as shown in FIG. 2, this configuration of the outer surface 70 of the poppet 60 results in the outer surface 70 having a first outer diameter 95 outside of the recess 74, and a second outer diameter 96 perpendicular to the bottom 86 of the recess 74. The second outer diameter 96 is less than the first outer diameter 95.

As shown in FIG. 2, the poppet 60 is also provided with a longitudinal axis 100 extending from the first end 64 to the second end 68 and located on a center of the first outer diameter 95 and the second outer diameter 96. In the embodiment shown, the recess 74 extends normal to the longitudinal axis 100. It should be understood however, that the recess 74 does not need to extend normal to the longitudinal axis 100, but can extend at other angles relative to the longitudinal axis 100. Further, the example of the recess 74 shown in FIG. 2 has the side wall 84a and the sidewall 84b being generally linear in shape and equidistantly spaced. It should be understood, however, that the sidewall 84a and a sidewall 84b can be provided with other shapes such as zigzags or the like so long as a portion of the servo shaft 28 can be positioned within the recess 74 so as to provide the mechanical connection between the servo shaft 28 and the poppet 60 as described herein.

To further reduce the possibility of sites where cracks can initiate resulting in fractures within the poppet 60, the outer surface 70 can optionally be provided with a third root radius 102, and a fourth root radius 104. The third root radius 102 is located at an intersection of the outer surface 70 and the first end 64. The fourth root radius 104 is located at an intersection of the outer surface 70 and the second end 68. In other embodiments, the third root radius 102 and/or the fourth root radius 104 can be eliminated.

FIG. 3 is a cross-sectional view of an exemplary embodiment of the servo shaft 28 of the electromechanical actuator 20. As discussed above, the servo shaft 28 may be coupled to the rotary actuator 24 via the screw 25, for example, such that rotary movement of the rotary actuator 24 is converted to linear movement of the servo shaft 28. The servo shaft 28 has a first end 110, a second end 112 (see FIG. 1), and a shaft component 115 extending along a longitudinal axis 114 between the first end 110 and the second end 112. The first end 110 has an opening 116 extending into the servo shaft 28, such that the servo shaft 28 has a sidewall 120 extending around and defining the opening 116. The sidewall 120 is at least partially constructed of a ductile material. In some embodiments, the servo shaft 28 includes a coupling component 113 and a shaft component 115. The coupling component 113 and the shaft component 115 can be separate devices made of a ductile material that are connected together by any suitable methodology, such as threads and a set screw. In some embodiments, the coupling component 113 and the shaft component 115 are integrally formed so as to form a unitary structure. In general, the coupling component 113 is at the first end of the servo shaft 28 and includes the opening 116 and the sidewall 120. The shaft component 115 is connected to the coupling component 113 and extends towards the second end 112. In some embodiments, the coupling component 113 and the shaft component 115 are co-linear.

As best shown in FIG. 3A, the sidewall 120 is provided with an interior surface 122 having an interior dimension, which will be described herein by way of example as an interior diameter 124. The interior surface 122 may have a circular shape as shown in FIG. 3A with a center of the circle being on the longitudinal axis 114. It should be understood that the sidewall 120 may have a cylindrical shape to correspond to a cylindrical shape of the outer surface 70 of the poppet 60. It should be understood however, that the interior surface 122 of the sidewall 120 may be provided with other shapes, such as a hexagonal shape so long as the interior surface 122 is sized and dimensioned to permit the poppet 60 to be positioned within the opening 116, and a portion of the sidewall 120 can be deformed into the recess 70.

In one embodiment, the opening 116 extends into the coupling component 113 of the servo shaft 28 a distance 130 less than the length 82 of the poppet 60 so that when the poppet 60 is placed into the opening 116 with the second end 68 engaging the servo shaft 28 at a bottom 132 of the opening 116, the first end 64 of the poppet 60 extends from the first end 110 of the servo shaft 28. In one embodiment, the interior diameter 124 is equal to and/or slightly larger, e.g., 1 or 2 thousands of an inch greater than the first outer diameter 95, so as to permit the poppet 60 to be positioned within the opening 116. The distance 130 of the opening 116 can be greater than the length 82 of the poppet 60 if the opening 116 has a shoulder or other structure (e.g., a spacer to provide a length adjustment to the poppet 60 and thereby support/oppose the poppet 60 to keep the poppet 60 from inadvertently moving farther within the opening 116. In some embodiments, a shock absorbing component, such as a spring, can be provided within the opening 116 and between the poppet 60 and the bottom 132 to provide a length adjustment to the poppet 60 and also to absorb energy applied to the poppet 60.

FIG. 4 is a cross-sectional view of an exemplary embodiment of the servo shaft 28 of the electromechanical actuator 20 connected to the poppet 60 in accordance with the present disclosure. FIG. 5 is an enlarged view of FIG. 4 showing an interconnection between the servo shaft 28 and the poppet 60 in accordance with the present disclosure. In one embodiment, the longitudinal axes 100 and 114 are co-located and aligned, such that the poppet 60 is positioned in a concentric relationship with the servo shaft 28.

As shown in FIGS. 4 and 5, the poppet 60 is positioned within the opening 116 such that the first end 64 of the poppet 60 extends from the first end 110 of the servo shaft 28. Desirably, the poppet 60 may be positioned within the opening 116 such that the second end 68 of the poppet 60 engages the servo shaft 28 at the bottom 132 so as to prevent the poppet 60 from moving in a direction towards the servo shaft 28. Once the poppet 60 is positioned within the opening 116, one or more connection portion 140 of the sidewall 120 is positioned within the recess 74 so as to secure the poppet 60 to the servo shaft 28. In one embodiment, the sidewall 120 is constructed of a ductile material that can be deformed into the recess 74 so as to form the connection portion 140. The connection portion 140 of the sidewall 120 can be formed using any suitable process such as hydroforming. In other embodiments, a device such as a forming tool can be used to deform the sidewall 120 into the recess 74. In one embodiment, the sidewall 120 is pressed into the entire recess 74 thereby forming a ring that joins the poppet 60 to the servo shaft 28. In this embodiment, the connection portion 140 of the sidewall 120 being positioned within the recess 74 having two sidewalls 84a and 84b provides a bidirectional attachment. If the recess 74 only has one sidewall, then the connection portion 140 of the sidewall 120 being positioned within the recess 74 forms a unidirectional attachment engaging only one sidewall 84.

In other embodiments, only sections of the sidewall 120 may be pressed into portions of the recess 74 rather than the entire recess 74 to form multiple connection portions 140 in the recess 74. In yet another embodiment in which the poppet 60 is provided with more than one recess 74, multiple connection portions 140 may be formed by deforming multiple sections of the sidewall 120 into the recesses 74, e.g., one or more connection portion 140 positioned within each recess 74.

The servo shaft assembly 61 can be made by positioning at least a portion of the poppet 60 into the opening 116 extending into the first end 110 of the coupling component of the servo shaft 28 such that the recess 74 formed within the poppet 60 is positioned within the opening 116 and surrounded by the sidewall 120 of the first end 110 of the servo shaft 28. At least a portion of the sidewall 120 is constructed of a ductile material as discussed above. The ductile material is aligned with the recess 74. Once the poppet 60 is positioned within the opening 116, the ductile material can be deformed into the recess 74 so as to secure the poppet 60 into the opening 116.

The electromechanical actuator assembly 20, and servo shaft assembly 61 have a variety of advantages over the conventional electromechanical actuators and shaft assemblies, including a higher load capability than any other methods. For example, poppets attached to a servo shaft with pins or screws achieve a pull strength on the order of two or three hundred pounds. The servo shaft assembly 61 of the present disclosure achieved a pull strength between the poppet 60 and the servo shaft 28 of over one thousand pounds.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An electromechanical actuator assembly, comprising:
    an actuator having an actuator shaft;
    a servo shaft coupled to the actuator shaft, the servo shaft having a first end, the first end of the servo shaft having an opening extending into the servo shaft, such that the servo shaft has a sidewall extending around and defining the opening, the sidewall of the servo shaft is at least partially constructed of a ductile material, the servo shaft having a first hardness, a first modulus of elasticity, and a first fracture toughness;
    a housing having an opening aligned with the first end of the servo shaft; and
    a poppet positioned within the opening of the servo shaft and extending into the first end of the servo shaft, the poppet having a first end outside of the opening of the servo shaft, a second end within the opening of the servo shaft, and an outer surface extending between the first end of the poppet and the second end of the poppet, the poppet having a recess formed in the outer surface and positioned between the first end of the poppet and the second end of the poppet, the recess being defined by at least one sidewall and a bottom, at least a portion of the ductile material of the sidewall of the servo shaft being positioned within the recess of the poppet to secure the poppet into the opening of the servo shaft such that the poppet does not move relative to the servo shaft, the poppet having a second hardness greater than the first hardness, a second modulus of elasticity greater than the first modulus of elasticity, and a second fracture toughness less than the first fracture toughness.

2. The electromechanical actuator assembly of claim 1, wherein the recess of the poppet is an annular recess devoid of any ends and extends continuously around the outer surface of the poppet.

3. The electromechanical actuator assembly of claim 2, the outer surface of the poppet having a first outer diameter outside of the annular recess, and a second outer diameter adjacent to the bottom of the annular recess, the second outer diameter being less than the first outer diameter.

4. The electromechanical actuator assembly of claim 1, wherein the poppet includes a first longitudinal axis extending between the first end of the poppet and the second end of the poppet, and wherein the servo shaft includes a second longitudinal axis extending from the first end of the servo shaft, and wherein the first longitudinal axis of the poppet and the second longitudinal axis of the servo shaft are co-located and aligned such that the poppet is concentric with the servo shaft.

5. The electromechanical actuator assembly of claim 1, wherein the recess of the poppet is defined by two sidewalls and the bottom, the two sidewalls being spatially disposed.

6. A method of making an assembly, comprising:
    positioning at least a portion of a poppet into an opening extending into a first end of a coupling component such that a recess formed in an outer surface of the poppet is positioned within the opening extending into the first end of the coupling component and surrounded by a sidewall of the first end of the coupling component, at least a portion of the sidewall of the first end of the coupling component being constructed of a ductile material, the ductile material aligned with the recess formed in the outer surface of the poppet, the coupling component having a first hardness, a first modulus of elasticity, and a first fracture toughness; and
    deforming the ductile material of the first end of the coupling component into the recess formed in the outer surface of the poppet so as to secure the poppet into the opening of the first end of the coupling component such that the poppet does not move relative to the coupling component, the poppet being constructed of at least one of a ceramic or carbide material having a second hardness greater than the first hardness, a second modulus of elasticity greater than the first modulus of elasticity, and a second fracture toughness less than the first fracture toughness.

7. The method of claim 6, wherein the recess formed in the outer surface of the poppet is an annular recess devoid of any ends and extends continuously around the outer surface of the poppet, and wherein deforming is defined further as deforming the ductile material of the first end of the coupling component into the recess formed in the outer surface of the poppet to form a connection portion having a ring shape.

8. The method of claim 7, wherein the outer surface of the poppet has a first outer diameter outside of the annular recess, and a second outer diameter adjacent to a bottom of the annular recess, the second outer diameter being less than the first outer diameter.

9. The method of claim 6, wherein the poppet includes a first longitudinal axis extending between a first end of the poppet and a second end of the poppet, and wherein the coupling component includes a second longitudinal axis extending from the first end of the coupling component, and wherein positioning the poppet into the opening of the coupling component is defined further as positioning at least a portion of the poppet into the opening of the coupling component such that the first longitudinal axis of the poppet and the second longitudinal axis of the coupling component are co-located and aligned and such that the poppet is concentric with the coupling component.

10. The method of claim 6, wherein the recess formed in the outer surface of the poppet is defined by two sidewalls and a bottom, the two sidewalls being spatially disposed.

11. The method of claim 6, wherein the coupling component is connected to a shaft component of a servo shaft.

* * * * *